United States Patent [19]
Nakai

[11] Patent Number: 5,589,683
[45] Date of Patent: Dec. 31, 1996

[54] OPTICAL RECEIVER APPARATUS FOR QUICKLY DETECTING LOSS OF A COMPOSITE OPTICAL SIGNAL INPUT EMPLOYING A LOSS-OF-CLOCK DETECTOR

[75] Inventor: Yukako Nakai, Kawasaki, Japan

[73] Assignee: Fujitsu Limited, Kanagawa, Japan

[21] Appl. No.: 308,587

[22] Filed: Sep. 19, 1994

[30] Foreign Application Priority Data

Sep. 20, 1993 [JP] Japan .................................. 5-233102

[51] Int. Cl.⁶ ..................................................... H01J 40/14
[52] U.S. Cl. ..................... 250/214 R; 359/161; 359/189; 375/359; 375/357; 375/228
[58] Field of Search ................................. 250/551, 214 R, 250/227.15, 227.16; 359/110, 161, 189; 356/73.1; 375/224, 359, 357, 228; 371/61, 8.1, 7

[56] References Cited

U.S. PATENT DOCUMENTS

| | | | |
|---|---|---|---|
| 4,308,472 | 12/1981 | McLauglin | 375/357 |
| 4,473,901 | 9/1984 | Jensen | 359/161 |
| 4,644,567 | 2/1987 | Artun et al. | 375/357 |
| 4,757,193 | 7/1988 | Kollanyi | 250/214 R |
| 4,876,701 | 10/1989 | Sanner | 375/357 |
| 5,418,905 | 5/1995 | Rarity et al. | 359/161 |

FOREIGN PATENT DOCUMENTS

| | | |
|---|---|---|
| 2947770 | 7/1981 | Germany . |
| 3117221 | 2/1983 | Germany . |
| 3202063 | 8/1983 | Germany . |
| 2064273 | 6/1981 | United Kingdom . |

OTHER PUBLICATIONS

Dr. Baier, Elektronik–Lexikon, Franckh'sche Verlagshandlung Stuttgart 1082, p. 607, Jan. 1983.
Tietze–Schenk, Halbleiter–Schaltungstechnik 6, Auflage 1983, Springer–Verlag, Berlin usw.

Primary Examiner—Stephone Allen

[57] ABSTRACT

An optical signal receiver apparatus contains: a photoelectric conversion circuit for receiving an optical signal conveying cyclic timing information, and converting the optical signal into an electrical signal conveying the cyclic timing information; a receiving clock signal extraction circuit for extracting a receiving clock signal indicating the cyclic timing information, from the electrical signal; and a loss-of-clock digital-detection circuit for detecting absence of a change in a digital level of the receiving clock signal.

6 Claims, 7 Drawing Sheets

OPTICAL RECEIVER APPARATUS FOR QUICKLY DETECTING LOSS OF A COMPOSITE OPTICAL SIGNAL INPUT EMPLOYING A LOSS-OF-CLOCK DETECTOR

BACKGROUND OF THE INVENTION (1) Field of the Invention

The present invention relates to an optical signal receiver apparatus used in an optical signal transmission system. In optical signal transmission systems, usually, a protection (stand-by) system is provided in addition to a working system, and when trouble occurs in the working system, the operation is switched to the protection system. The trouble in such a system is often detected as a loss of an input signal (receiving signal) in an optical receiver apparatus. Since, when trouble occurs in the working system, the above switching from the working system to the protection system is required to be carried out quickly, the loss of an input signal (receiving signal) in an optical receiver apparatus is also required to be detected quickly.

(2) Description of the Related Art

In optical signal receiver apparatuses used in optical signal transmission systems, an optical signal transmitted through an optical transmission line is converted to an electrical signal, and a clock signal is extracted as a receiving clock signal from the electrical signal. Then, data is regenerated from the electrical signal by using the receiving clock signal. In the conventional construction of an optical signal receiver apparatus, a successive-zero detection unit and a level detection unit are provided for detecting the loss of the receiving signal. The level detection unit compares the peak level of the extracted receiving clock signal with a predetermined reference level Vr, and outputs a level alarm signal when the lowering of the peak level under the predetermined reference level Vr is detected by the comparison. The successive-zero detection unit detects a predetermined number of successive zeros in the regenerated data. When the predetermined number of successive zeros is detected in the regenerated data, the successive-zero detection unit outputs an active successive-zero detection signal.

However, in the conventional construction, there is a drawback that it takes hundreds of microseconds to several milliseconds to output the level alarm signal since the above peak level is obtained by an analog peak detection circuit containing a charging circuit, and the successive-zero detection unit can detect the loss of the input only when the receiving clock signal is supplied thereto. Namely, in the conventional optical signal receiver apparatus, generally, the loss of the optical signal input cannot be detected quickly.

SUMMARY OF THE INVENTION

An object of the present invention is to provide an optical signal receiver apparatus, wherein a loss of an optical signal input thereto can be quickly detected.

According to the present invention, there is provided an optical signal receiver apparatus containing: a photoelectric conversion circuit for receiving an optical signal conveying cyclic timing information, and converting the optical signal into an electrical signal conveying the cyclic timing information; a receiving clock signal extraction circuit for extracting a receiving clock signal indicating the cyclic timing information, from the electrical signal; and a loss-of-clock digital-detection circuit for detecting absence of a change in a digital level of the receiving clock signal.

(1) In the above construction of the present invention, the above loss-of-clock digital-detection circuit may contain a latch circuit for latching a predetermined electric level cyclically in synchronization with the digital level change in the receiving clock signal, and being reset by receiving a reset signal having a frequency less than the frequency of the receiving clock signal.

(2) The above construction of the present invention, may further contain a peak level lowering detection circuit for detecting an analog peak level of the receiving clock signal, and detecting lowering of the analog peak level of the receiving clock signal by comparing the analog peak level with a predetermined threshold level.

(3) In the above construction of (2), the optical signal receiver apparatus may further contain a circuit for outputting an alarm signal when the loss-of-clock digital-detection circuit detects the absence of the change in the digital level of the receiving clock signal or when the peak level lowering detection circuit detects lowering of the analog peak level of the receiving clock signal.

(4) In the above construction of the present invention, the optical signal may further convey digital data, and the electrical signal may further convey the digital data; and the above optical signal receiver apparatus may further contain, a data regenerating circuit for regenerating the digital data from the electrical signal, and a successive-zero detection circuit for detecting a predetermined number of successive zeros in the digital data regenerated by the data regenerating circuit.

(5) In the above construction of (4), the optical signal receiver apparatus may further contain a circuit for outputting an alarm signal when the loss-of-clock digital-detection circuit detects the absence of the change in the digital level of the receiving clock signal or when the successive-zero detection circuit detects the predetermined number of successive zeros in the digital data regenerated by the data regenerating circuit.

(6) In the above construction of (4), the optical signal receiver apparatus may further contain: a peak level lowering detection circuit for detecting an analog peak level of the receiving clock signal, and detecting lowering of the analog peak level of the receiving clock signal by comparing the analog peak level with a predetermined threshold level; and a circuit for outputting an alarm signal when the loss-of-clock digital-detection circuit detects the absence of the change in the digital level of the receiving clock signal, or when the successive-zero detection circuit detects the predetermined number of successive zeros in the digital data regenerated by the data regenerating circuit, or when the peak level lowering detection circuit detects lowering of the analog peak level of the receiving clock signal.

DESCRIPTION OF THE PREFERRED EMBODIMENTS

BASIC CONSTRUCTION OF FIRST ASPECT OF INVENTION (FIG. 4)

Figure 1:
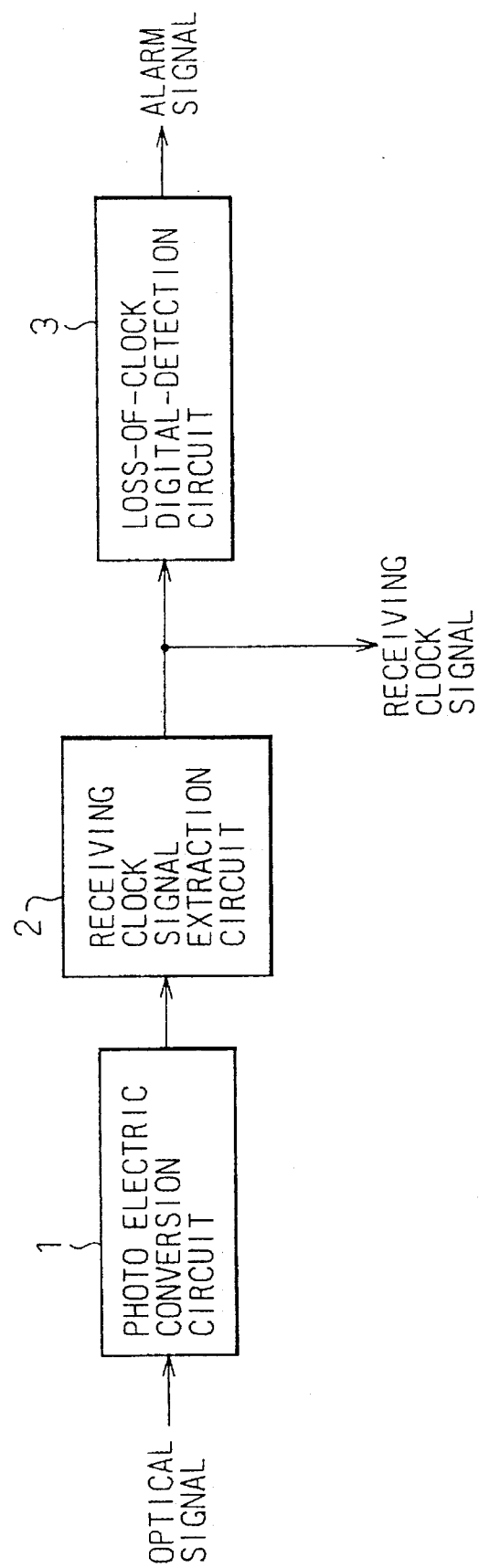
FIG. 1 is a diagram illustrating a basic construction of the optical signal receiver apparatus according to the present invention.

FIG. 1 is a diagram illustrating a basic construction of the optical signal receiver apparatus according to the present invention. In FIG. 1, reference numeral 1 denotes a photoelectric conversion circuit, 2 denotes a receiving clock signal extraction circuit, and 3 denotes a loss-of-clock digital-detection circuit.

The loss-of-clock digital-detection circuit 3 detects absence of a change in a digital level of the receiving clock signal. Therefore, according to the construction of FIG. 2, the loss of the optical signal input can be quickly detected.

CONVENTIONAL CONSTRUCTION OF OPTICAL SIGNAL RECEIVER APPARATUS (FIGS. 2, 3, and 4A to 4C)

For the purpose of comparison with the conventional construction of the optical signal receiver apparatus, first, the conventional construction of the optical signal receiver apparatus is explained in detail below.

Figure 2:
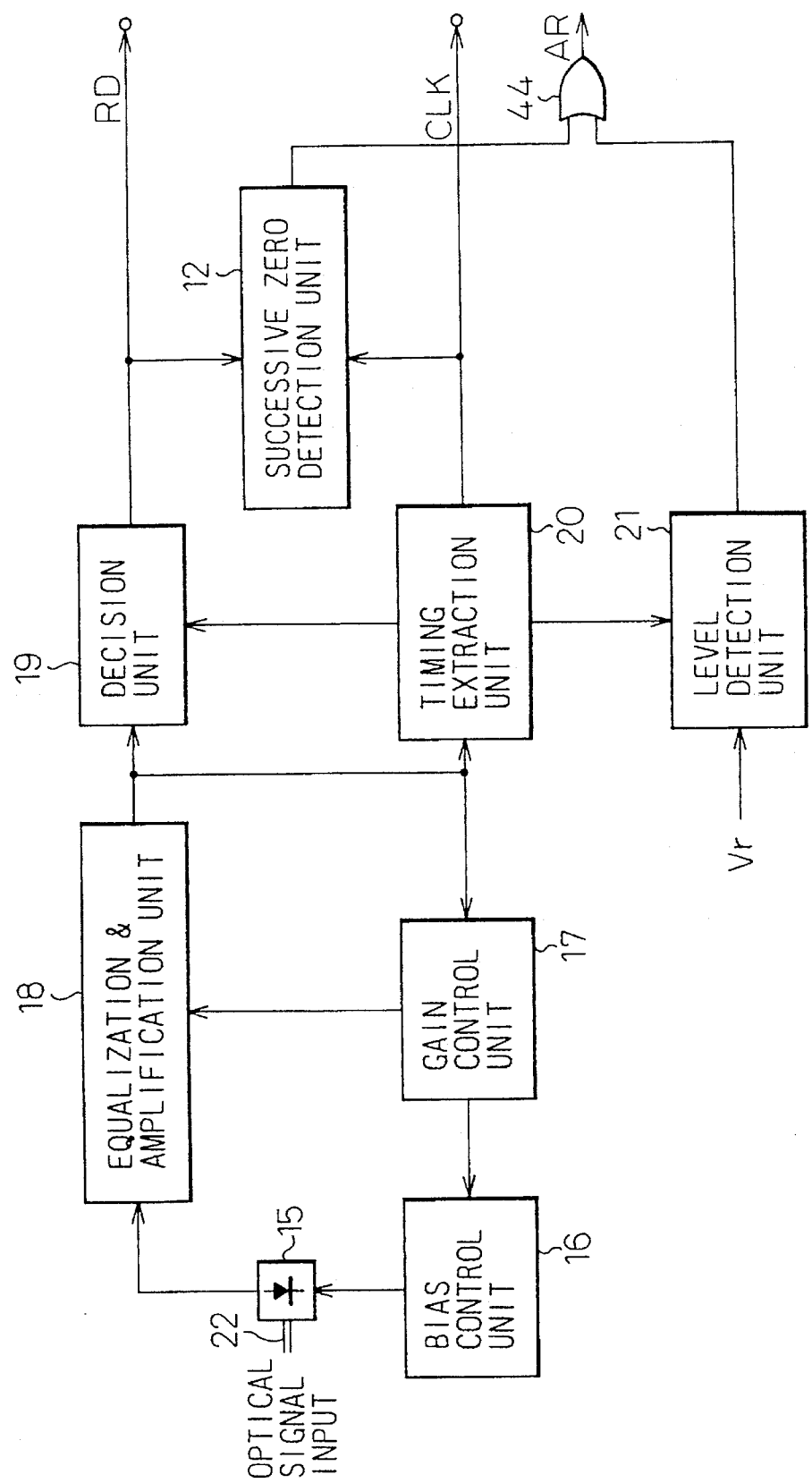
FIG. 2 is a diagram illustrating a conventional construction of an optical signal receiver apparatus.

FIG. 2 is a diagram illustrating the conventional construction of an optical signal receiver apparatus. In FIG. 2, reference number 12 denotes a successive-zero detection unit, 15 denotes a photoelectric conversion unit containing a photoelectric conversion device such as an avalanche photodiode (APD), 16 denotes a bias control unit, 17 denotes a gain control unit, 18 denotes an equalization and amplification unit, 19 denotes a decision unit, 20 denotes a timing extraction unit, 21 denotes a level detection unit, 22 denotes an optical transmission line, and 44 denotes an OR gate.

An optical signal transmitted through the optical transmission line 22 is input into the photoelectric conversion unit 15, and is converted to an electrical signal. The electrical signal is equalized and amplified in the equalization and amplification unit 18, and the output of the equalization and amplification unit 18 is supplied to the decision unit 19, the gain control unit 17, and the timing extraction unit 20. The gain control unit 17 controls the bias control unit 16 and a gain of the equalization and amplification unit 18 so that the output level of the equalization and amplification unit 18 is maintained in a predetermined range. The bias control unit 16 controls the bias of the photoelectric conversion unit 15 to control a conversion gain of the photoelectric conversion unit 15. Thus, the function of the automatic gain control is realized by the above construction.

The timing control extraction unit 20 is usually constructed with, for example, a band-pass filter having a center frequency corresponding to the frequency of the receiving clock signal, a resonance circuit, an amplifier, and a limiter circuit (not shown). The timing control extraction unit 20 extracts a frequency component corresponding to the receiving clock signal from the output of the equalization and amplification unit 18 by the band-pass filter, resonates the extracted component with the frequency of the receiving clock signal by the resonance circuit, generates a receiving clock signal in the form of a rectangular wave and having a predetermined peak level determined by the limiter circuit. The receiving clock signal obtained by the timing extraction unit 20 is supplied to the level detection unit 21, the successive-zero detection unit 12, and other constructions in the following stages (not shown).

The decision unit 19 determines a symbol value (0 or 1) carried by the output of the equalization and amplification unit 18 at each cycle of the receiving clock signal to regenerate data RD. The regenerated data RD and the receiving clock signal are supplied to the other constructions in the following stages.

The level detection unit 21 compares the peak level of the receiving clock signal extracted by the timing extraction unit 20 (or the output level of the equalization and amplification unit 18), with a predetermined reference level Vr, and outputs a level alarm signal when the lowering of the peak level under the predetermined reference level Vr is detected by the comparison. The level alarm signal is applied to one of input terminals of the OR gate 44.

The successive-zero detection unit 12 detects a predetermined number of successive zeros in the output of the decision unit 19. When the predetermined number of successive zeros is detected in the output of the decision unit 19, the successive-zero detection unit 12 outputs an active successive-zero detection signal. The successive-zero detection signal is applied to the other input terminal of the OR gate 44.

The output of the OR gate 44 is a loss-of-input alarm signal AR. Thus, either of the above level alarm signal and the successive-zero detection signal is active, the loss-of-input alarm signal AR is active.

As explained above, it takes hundreds of microseconds to several milliseconds to output the level alarm signal.

Figure 3:
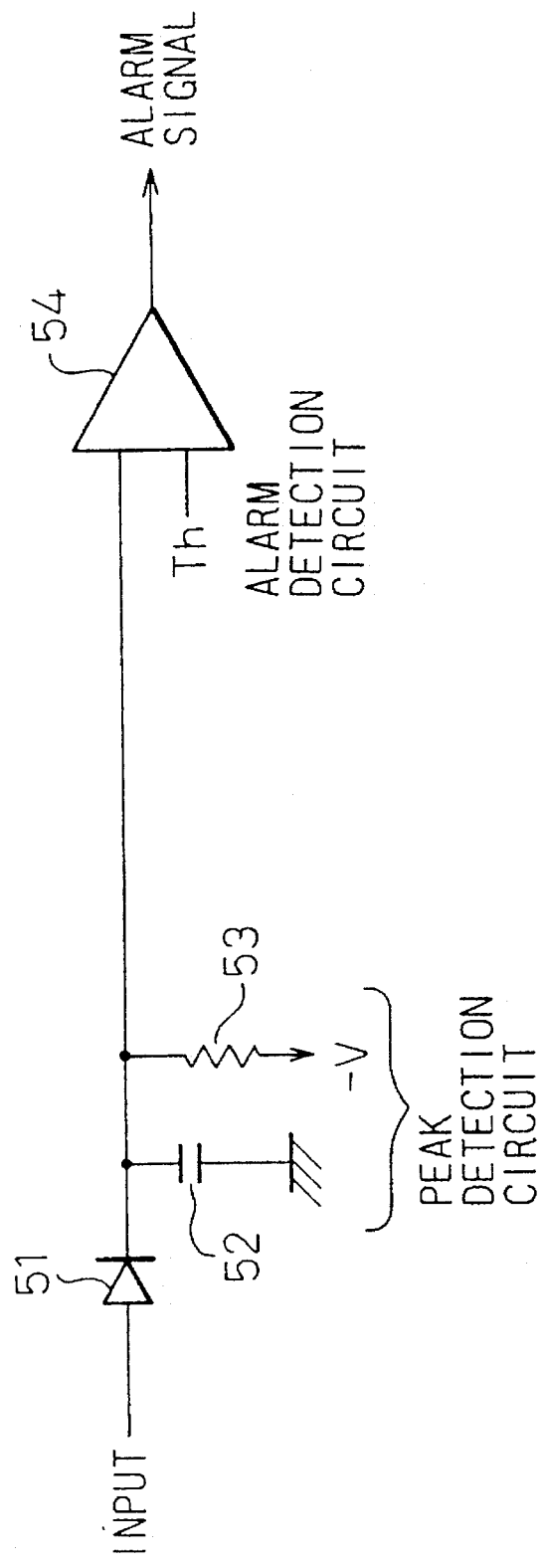
FIG. 3 is a diagram illustrating an outline of the construction of the level detection unit 21 in FIG. 2.

FIG. 3 is a diagram illustrating an outline of the construction of the level detection unit 21 in FIG. 2. In FIG. 3, reference number 51 denotes a diode, 52 denotes a capacitor, 53 denotes a resistor, and 54 denotes a comparator.

The diode 51, the capacitor 52, and the resistor 53 constitutes a peak detection circuit which detects the peak level of the input thereof, and the comparator 54 constitutes a level alarm detection circuit. The receiving clock signal extracted by the timing extraction unit 20 (or the output level of the equalization and amplification unit 18) is input into the construction of FIG. 3, and the peal level input signal is detected and output to one input terminal of the comparator 54. The comparator compares the peak level with the above predetermined reference level Vr, and outputs an active level alarm signal when the peak level is detected to be lower than the predetermined reference level Vr. Since the peak detection circuit in the construction of FIG. 3 contains a charging circuit constituted by the capacitor 52 and the resistor 53, it takes a long time for the level detection unit 21 to detect the lowering of the peak level.

Figure 4:
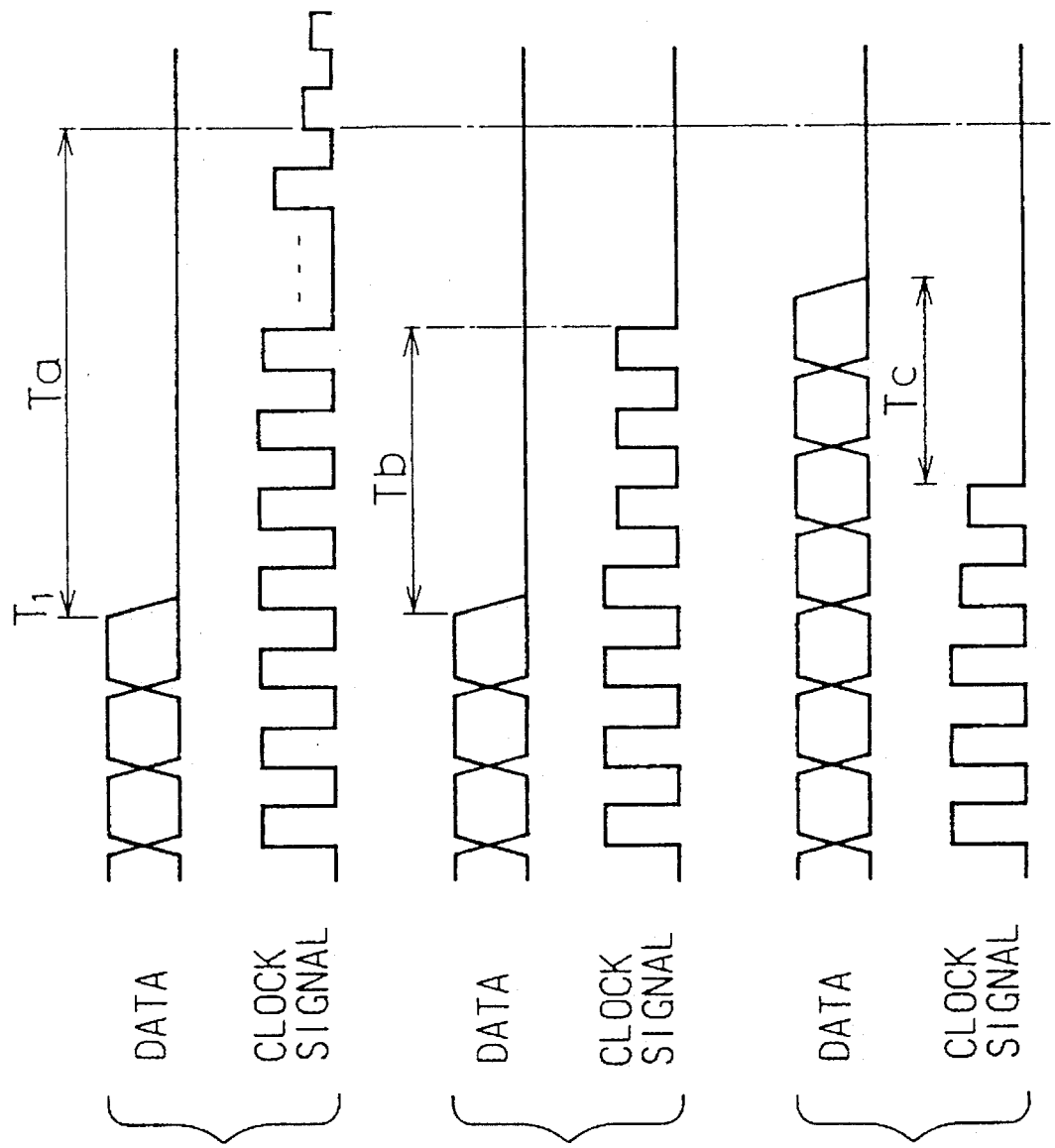
FIGS. 4A to 4C are timing diagrams of example operations in three possible cases which may occur in the construction of FIG. 2 when the optical signal input is lost.

FIGS. 4A to 4C age diagrams illustrating three possible cases which may occur in the construction of FIG. 2 when the optical signal input is lost.

In the case indicated in FIG. 4A, it is assumed that the output in the decision unit 19 becomes zero at the time T1 due to the loss of the optical signal input, and the receiving clock signal is output after the time T1 for a duration Ta which is larger than the time for the successive-zero detection unit 12 to detect the successive zeros in the output of the decision unit 19. In this case, the successive-zero detection unit 12 can detect the abnormality, and outputs an active successive-zero detection signal. Thus, an active alarm signal AR is output from the OR gate 44 at a relatively early timing.

In the case indicated in FIG. 4B, it is assumed that the output in the decision unit 19 becomes to zero at the time T1 due to the loss of the optical signal input, and the receiving clock signal is output after the time T1 for a duration Tb which is smaller than the time for the successive-zero detection unit 12 to detect the successive zeros in the output of the decision unit 19. In this case, the successive-zero detection unit 12 cannot detect the abnormality, and thus, an active alarm signal AR cannot be output from the OR gate 44 until the level detection unit 21 detects the lowering of the peak level of the output of the timing extraction unit 20 or the equalization and amplification unit 18.

In the case indicated in FIG. 4C, it is assumed that the decision unit 19 can operate for a duration Tc after the receiving clock signal from the timing detection unit 20 is stopped due to the loss of the optical signal input. In this case, the successive-zero detection unit 12 cannot detect the abnormality, and thus, an active alarm signal AR cannot be output from the OR gate 44 until the level detection unit 21 detects the lowering of the peak level of the output of the timing extraction unit 20 or the equalization and amplification unit 18.

Thus, in the conventional optical signal receiver apparatus, generally, the loss of the optical signal input cannot be detected quickly.

Figure 5:
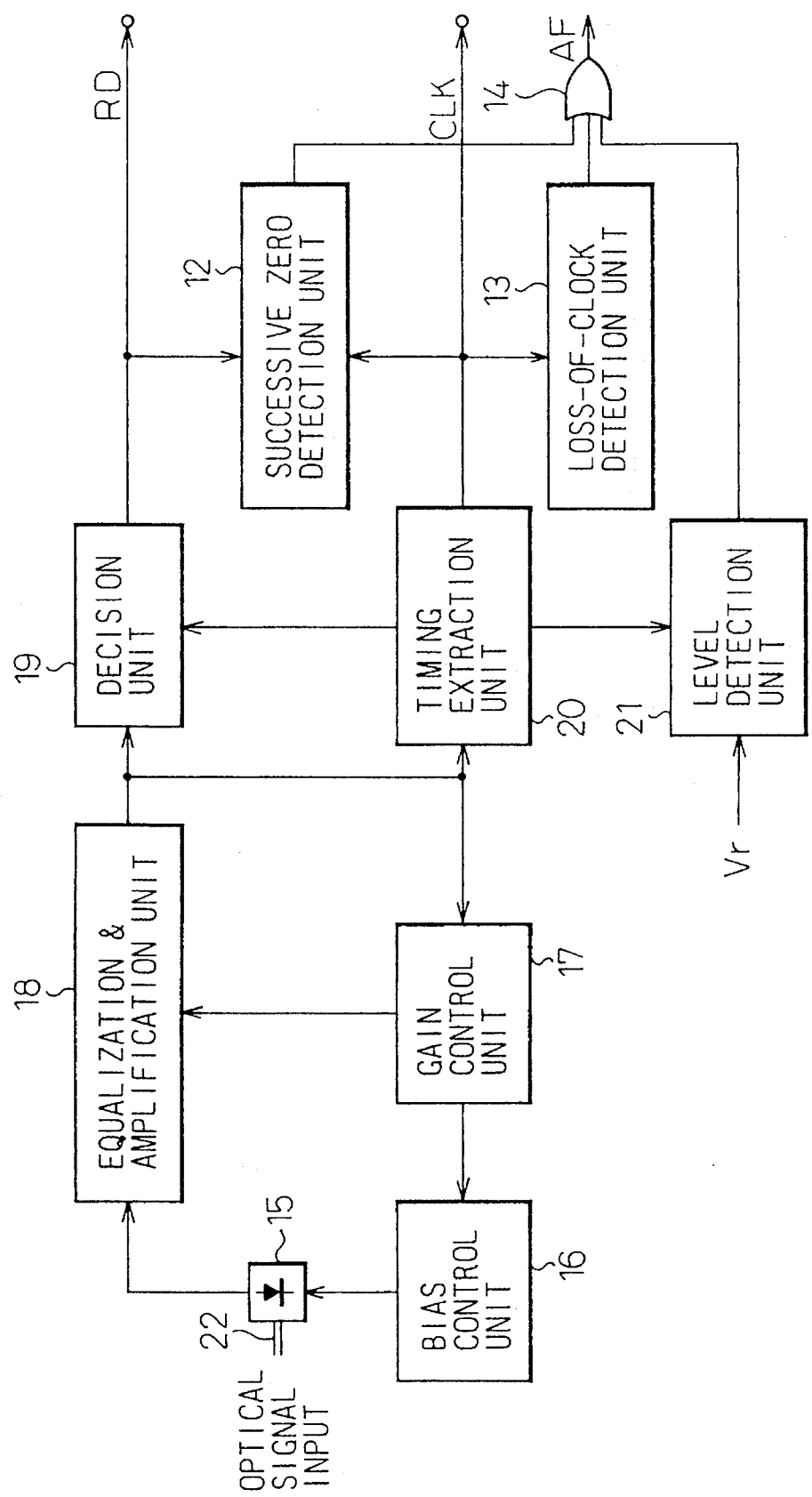
FIG. 5 is a diagram illustrating the construction of the optical signal receiver apparatus as an embodiment of the present invention.
Figure 6:
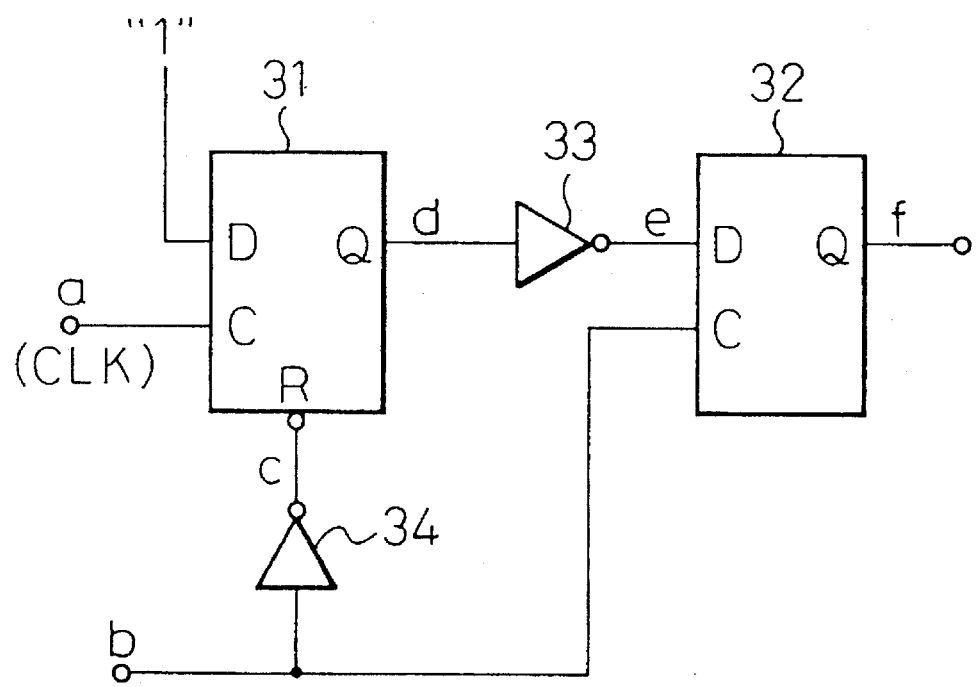
FIG. 6 is a diagram illustrating an example construction of the loss-of-clock detection unit 13 in the construction of FIG. 5.
Figure 7:
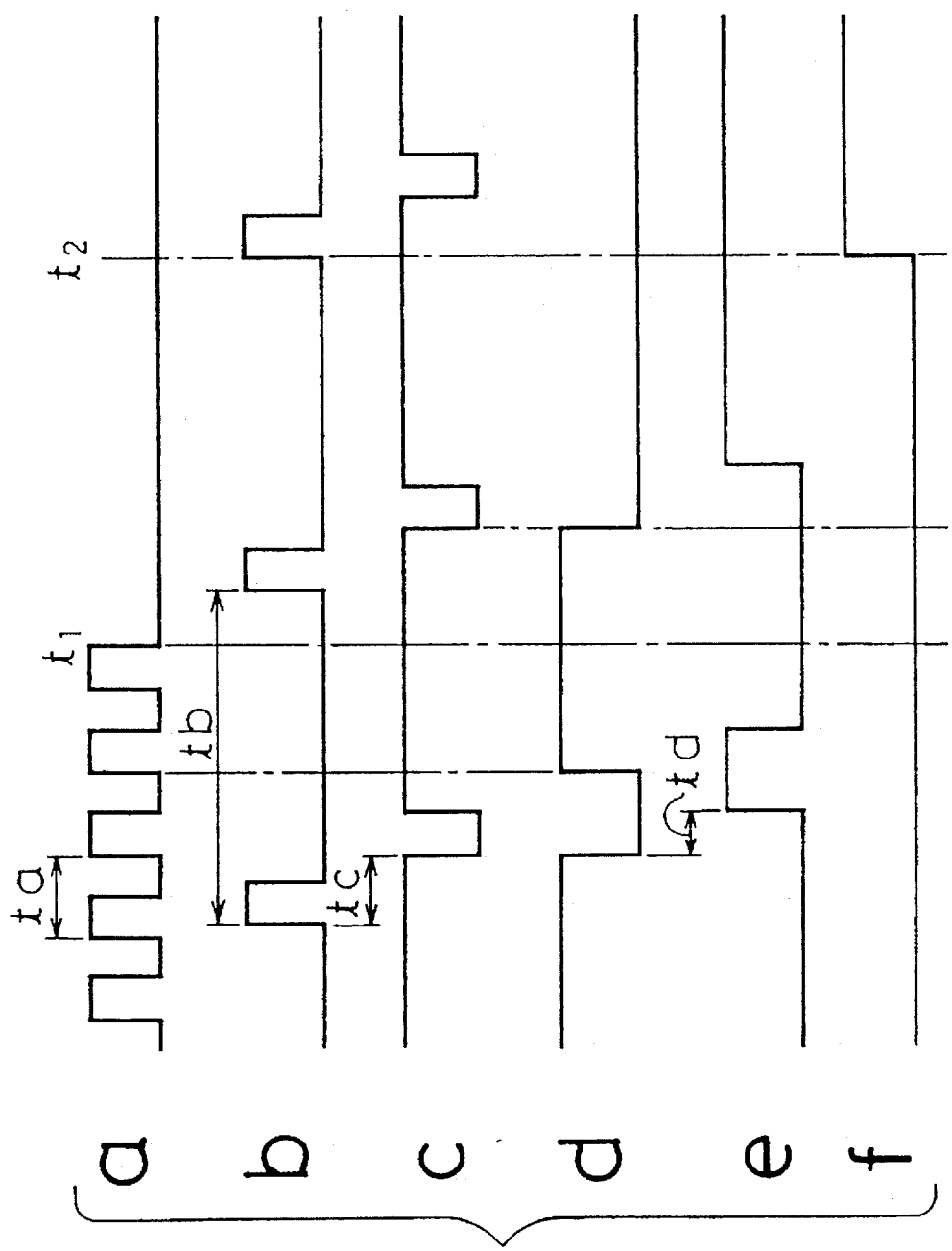
FIG. 7 shows timing diagrams a–f of an example operation of the construction indicated in FIGS. 5 and 6.

EMBODIMENT OF OPTICAL SIGNAL RECEIVER APPARATUS (FIGS. 5, 6, and 7)

FIG. 5 is a diagram illustrating the construction of the optical signal receiver apparatus according to the present invention. In the construction of FIG. 5, the loss-of-clock detection unit 13 is provided in addition to the conventional construction of the optical signal receiver apparatus as indicated in FIG. 2. The loss-of-clock detection unit 13 corresponds to the loss-of-clock digital-detection circuit 3 in the basic construction as indicated in FIG. 1. Namely, the loss-of-clock detection unit 13 detects absence of a change in a digital level of the receiving clock signal. In addition, the OR gate 14 is provided in the construction of FIG. 5, instead of the OR gate 44 in FIG. 2. The OR gate 14 receives the output of the loss-of-clock detection unit 13 in addition to the outputs of the successive-zero detection unit 12 and the level detection unit 21, and therefore, outputs an alarm signal when the loss-of-clock digital-detection unit 13 detects the absence of the change in the digital level of the receiving clock signal, or when the successive-zero detection unit 12 detects the predetermined number of successive zeros in the digital data regenerated by the decision unit 19, or when the level detection unit 21 detects lowering of the analog peak level of the receiving clock signal (or the output of the equalization and amplification unit 18).

FIG. 6 is a diagram illustrating an example construction of the loss-of-clock detection unit 13 in the construction of FIG. 5. In FIG. 6, reference numbers 31 and 32 each denote a D-type flip flop circuit, and 33 and 34 each denote an inverter. The logical high level "1" is constantly applied to the data input terminal D of the D-type flip flop circuit 31, and the above receiving clock signal (indicated by "a" in FIG. 6), which is output from the timing extraction unit 13, is applied to the edge-triggered input terminal C of the D-type flip flop circuit 31. In addition, a self-generated lower-frequency clock signal (indicated by "b" in FIG. 6), the frequency of which is smaller than the frequency of the receiving clock signal, is applied through the inverter 34 to the reset terminal R of the D-type flip flop circuit 31, where the output of the inverter 34 is a reset signal, and is indicated by "c" in FIG. 6. The self-generated lower-frequency clock signal b is generated by an oscillator (not shown) provided in the optical signal receiver apparatus or in an optical terminal station in which the optical signal receiver apparatus is provided. The non-inverted data output d of the D-type flip flop circuit 31 is applied through the inverter 33 to the data input terminal D of the D-type flip flop circuit 32, where the output of the inverter 33 is indicated by "e" in FIG. 6. The above self-generated clock signal is further applied to the edge-triggered input terminal C of the D-type flip flop circuit 32. The non-inverted data output f of the D-type flip flop circuit 32 is the output of the loss-of-clock detection unit 13. In the above construction of FIG. 6, the inverter 34 is provided for the purpose of delaying the reset signal c in the D-type flip flop circuit 31 relatively to the self-generated lower-frequency clock signal b applied to the edge-triggered input terminal of D-type flip flop circuit 32.

FIG. 7 is a timing diagram of an example operation of the construction indicated in FIGS. 5 and 6. In FIG. 7, timings of the respective signals a to f in the construction of FIG. 6 are indicated. The cycle of the receiving clock signal a is denoted by "ta", the cycle of the above self-generated lower-frequency clock signal is denoted by "tb", the delay time caused in the above inverter 34 is denoted by "tc", the delay time caused in the above inverter 33 is denoted by "td", and ta<tb.

In FIG. 7, the receiving clock signal a is normally applied to the edge-triggered input terminal of the D-type flip flop circuit 31 until the time t1. The D-type flip flop circuit 31 is reset by the application of the reset signal c thereto, the D-type flip flop circuit 31 is again set by the next rising of the receiving clock signal a as long as the receiving clock signal cyclically rises. The data output d of the D-type flip flop circuit 31, after being delayed by the inverter 33, is applied to the D-type flip flop circuit 32, and is latched in the D-type flip flop circuit 32 at the timing of the next rising of the self-generated lower-frequency clock signal b. However, since the frequency of the self-generated lower-frequency clock signal b is sufficiently lower than the frequency of the receiving clock signal a, the data input signal e of the D-type flip flop circuit 32 returns to the high level "1" after the data input signal e changes to a low level "0" due to the reset of the D-type flip flop circuit 31 in response to a falling of the reset signal c (corresponding to a rising of the self-generated lower-frequency clock signal b) before the next rising of the self-generated lower-frequency clock signal b is applied to the D-type flip flop circuit 32. Therefore, the data output f of the D-type flip flop circuit 32 is maintained at the low level as long as the receiving clock signal a is normally applied to the edge-triggered input terminal of the D-type flip flop circuit 31.

However, after the time t1, the receiving clock signal a stops. Therefore, in response to the next falling of the reset signal c, the data output d of the D-type flip flop circuit 31 changes to the low level. Then, after the delay td in the inverter 33, the high level of the data input e is applied to the D-type flip flop circuit 32, and in response to the next rising of the self-generated lower-frequency clock signal b the data output f of the D-type flip flop circuit 32 changes to the high level which is an active alarm signal indicating that the receiving clock signal is not detected.

Thus, according to the construction of FIGS. 5 and 6, the loss of the receiving clock signal can be detected within at most the twice the cycle tb of the self-generated lower-frequency clock signal b.

Since the only function required for the loss-of-clock detection unit 13 is to detect the absence of a change in a digital level of the receiving clock signal, persons skilled in the art will be able to construct the other constructions of the loss-of-clock detection unit 13 from only the above limitation to "detect the absence of a change in a digital level of the receiving clock signal". The construction of FIG. 6 is just an example of such constructions of satisfying the above requirement.

According to the provision of the present invention, the loss of the receiving clock signal can be quickly detected, and therefore, when trouble occurs in a working-system transmission line, the system can be quickly switched to the protection-system transmission line in response to the quick detection of the loss of the receiving clock signal.

Further, the above constructions for "detecting absence of a change in a digital level of the receiving clock signal" can be generally constructed as a digital circuit, and therefore, such constructions can be implemented in the form of a semiconductor integrated circuit, together with the successive-zero detection unit.

I claim:

1. An optical signal receiver apparatus comprising:

a photoelectric conversion circuit for receiving an optical signal conveying cyclic timing information, and converting the optical signal into an electrical signal conveying the cyclic timing information;

a receiving clock signal extraction circuit for extracting a receiving cock signal indicating the cyclic timing information, from the electrical signal; and a loss-of-clock digital-detection circuit for detecting absence of a change in a digital level of the receiving clock signal, wherein said loss-of-clock digital-detection circuit comprises a latch circuit for latching a predetermined constant electric level cyclically in synchronization with the digital level change in the receiving clock signal, and being reset by receiving a cyclic reset signal having a frequency less than the frequency of the receiving clock signal, the time required to detect loss of clock being determined by the frequency of said reset signal.

2. An optical signal receiver apparatus according to claim 1, further comprising a peak level lowering detection circuit for detecting an analog peak level of the receiving clock signal, and detecting lowering of the analog peak level of the receiving clock signal by comparing the analog peak level with a predetermined threshold level.

3. An optical signal receiver apparatus according to claim 2, further comprising a circuit for outputting an alarm signal when the loss-of-clock digital-detection circuit detects the absence of the change in the digital level of the receiving clock signal or when the peak level lowering detection circuit detects lowering of the analog peak level of the receiving clock signal.

4. An optical signal receiver apparatus according to claim 1, wherein said optical signal further conveys digital data, and the electrical signal further conveys the digital data; and said optical signal receiver apparatus further comprising, a data regenerating circuit for regenerating the digital data from the electrical signal, and a successive-zero detection circuit for detecting a predetermined number of successive zeros in the digital data regenerated by the data regenerating circuit.

5. An optical signal receiver apparatus according to claim 4, further comprising a circuit for outputting an alarm signal when the loss-of-clock digital-detection circuit detects the absence of the change in the digital level of the receiving clock signal or when the successive-zero detection circuit detects the predetermined number of successive zeros in the digital data regenerated by the data regenerating circuit.

6. An optical signal receiver apparatus according to claim 4, further comprising, a peak level lowering detection circuit for detecting an analog peak level of the receiving clock signal, and detecting lowering of the analog peak level of the receiving clock signal by comparing the analog peak level with a predetermined threshold level, and a circuit for outputting an alarm signal when the loss-of-clock digital-detection circuit detects the absence of the change in the digital level of the receiving clock signal, or when the successive-zero detection circuit detects the predetermined number of successive zeros in the digital data regenerated by the data regenerating circuit, or when the peak level lowering detection circuit detects lowering of the analog peak level of the receiving clock signal.

* * * * *